(No Model.)

E. P. NOBBS.
DRAWER PULL.

No. 404,495. Patented June 4, 1889.

Witnesses:
J. Stait
Chas. H. Smith

Inventor:
Edward P. Nobbs
per Lemuel W. Serrell Atty.

UNITED STATES PATENT OFFICE.

EDWARD P. NOBBS, OF WATERBURY, CONNECTICUT, ASSIGNOR TO THE AMERICAN RING COMPANY, OF SAME PLACE.

DRAWER-PULL.

SPECIFICATION forming part of Letters Patent No. 404,495, dated June 4, 1889.

Application filed March 16, 1889. Serial No. 303,539. (No model.)

*To all whom it may concern:*

Be it known that I, EDWARD P. NOBBS, of Waterbury, in the county of New Haven and State of Connecticut, have invented an Improvement in Drawer-Pulls, of which the following is a specification.

Drawer-pulls have heretofore been made with a split or open ring, the ends of which pass into a tubular socket, and the attaching-screw is within this socket, and either passes entirely through the same with the head outside the socket or else the screw-head is retained by a washer within the socket, the edges of the socket being turned over the washer.

My improvements are made with reference to simplifying the construction of the drawer-pull socket, so as to lessen the expense of manufacture, and at the same time to insure the requisite strength and prevent the split ring becoming detached from the socket.

Figure 1:
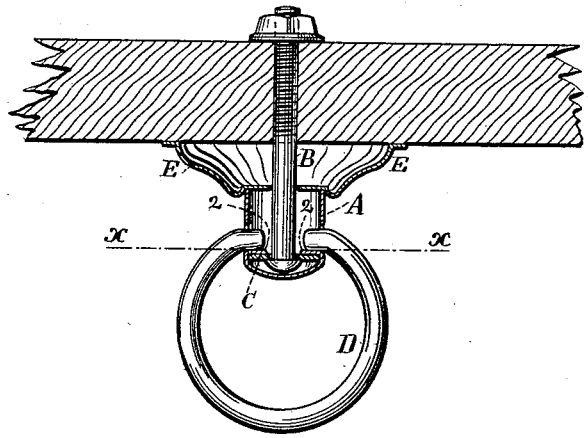
Figure 2:
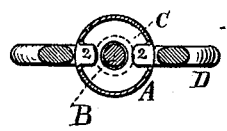
Figure 3:
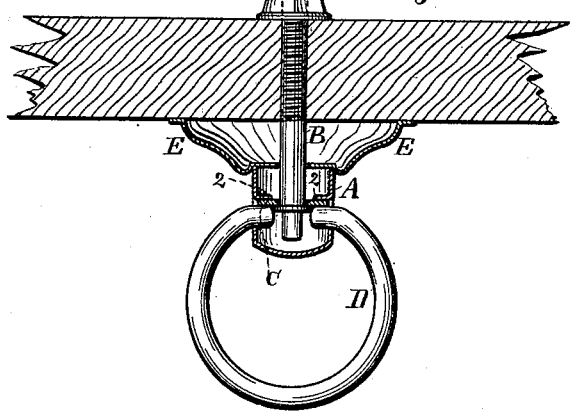

In the drawings, Figure 1 is a longitudinal section of the socket, the ring and screw being in elevation; and Fig. 2 is a section at the line $x$ $x$, and Fig. 3 is a longitudinal section of the socket in a modified form.

The socket A is made of sheet metal stamped up to shape and more or less ornamental. Within the socket is one end of the screw B, and around the head of the screw is a washer C of a size to fit within the socket. Instead of boring holes through the sides of the socket A for receiving the ends of the ring D, I cut ears 2 and press them inwardly at the sides of the socket, and such ears come into contact with the washer C and hold the same in position, and in cutting these ears I form the openings that are necessary in the sides of the sockets for the reception of the ends of the ring D.

When the washer C is between the head of the socket and the ears 2, as seen in Figs. 1 and 2, the shank of the screw will be between the ends of the ring D, and when the ring is pulled upon it will rest against the ears 2, and the strain will thereby be transferred to the washer C and screw B, and there is little or no strain upon the socket itself, and the ring cannot move in the direction of its circumference, because the body of the screw is between the open ends of the ring, it being presumed that the ring is sufficiently strong for the strain to which it is to be subjected.

In the form of socket represented in Fig. 3 the ears 2 are turned in the opposite direction from what they are in Fig. 1, so that the ends of the ring pass in between the washer C and the head of the socket, and the tension upon the ring in this case comes upon the socket, and is transferred through the ears to the washer C and screw B, and in this instance the shank of the screw has to be prolonged beyond the head, so as to pass in between the ends of the ring to prevent such ring moving in the direction of its circumference.

This drawer-pull is to be provided with a nut upon the screw-threaded portion thereof and within the drawer, as usual, and any suitable ornamental plate or rose E intervenes between the base of the socket and the face of the drawer.

It will be apparent that the washer C and screw B may be made in one piece, the washer becoming a head to the screw.

I claim as my invention—

1. The combination, with the screw B and ring D, of a socket A, having inwardly-projecting ears 2 cut from the socket at the openings into which the ends of the ring pass, and the washer or head C, against which the ears 2 act in retaining the socket and screw in their relative positions, substantially as set forth.

2. The combination, with the ring D and the socket A, having inwardly-projecting ears 2, of the screw B, passing between the ends of the ring and having a head or washer that is clamped toward the end of the socket A by the ears 2, the ends of the ring passing into the openings in the sides of the socket behind such ears, substantially as set forth.

Signed by me this 12th day of March, 1889.

EDWARD P. NOBBS.

Witnesses:
T. W. CHESSON,
D. S. W. PLUME.